United States Patent [19]

Yen et al.

[11] Patent Number: 5,795,496

[45] Date of Patent: Aug. 18, 1998

[54] POLYMER MATERIAL FOR ELECTROLYTIC MEMBRANES IN FUEL CELLS

[75] Inventors: Shaio-Ping S. Yen, Altadena; Sekharipuram R. Narayanan, St. Altadena; Gerald Halpert, Pasadena; Eva Graham, St. Pasadena; Andre Yavrouian, Glendale, all of Calif.

[73] Assignee: California Institute of Technology, Pasadena, Calif.

[21] Appl. No.: 561,899

[22] Filed: Nov. 22, 1995

[51] Int. Cl.⁶ .................. H01M 8/10; H01M 8/22; C08J 5/18
[52] U.S. Cl. .................. 252/62.2; 429/33; 429/192; 252/500; 252/518; 252/521; 521/27; 521/30
[58] Field of Search ............ 429/33, 192; 252/62.2, 252/500, 518, 521; 521/27, 30

[56] References Cited

U.S. PATENT DOCUMENTS

| | | | |
|---|---|---|---|
| 4,711,907 | 12/1987 | Sterzel | 527/27 |
| 5,013,765 | 5/1991 | Sluma et al. | 521/27 |
| 5,468,574 | 11/1995 | Ehrenberg et al. | 521/27 |
| 5,599,638 | 2/1997 | Surampudi et al. | 429/33 |

*Primary Examiner*—Alan Diamond
*Attorney, Agent, or Firm*—Fish & Richardson P.C.

[57] ABSTRACT

A polymer, PEEK or SPES is processed to use it as a proton conducting membrane for a fuel cell. Asymmetric properties are formed.

19 Claims, 3 Drawing Sheets

POLYMER MATERIAL FOR ELECTROLYTIC MEMBRANES IN FUEL CELLS

ORIGIN OF INVENTION

The invention described herein was made in the performance of work under a NASA contract and is subject to the provisions of Public Law 96-517 (35 USC 202) in which the Contractor has elected to retain title.

FIELD OF THE INVENTION

The present invention describes a new specialized polymer material, and its use in fuel cells which rely on oxidation- reduction reactions. More specifically, the present invention describes special materials which have proton conducting properties, and are suitable for use as electrolytic membranes in methanol oxidizing reducing fuel cells.

BACKGROUND AND SUMMARY OF THE INVENTION

Many electro-chemical oxidation reduction-driven applications require proton conductive materials. One specific fuel cell of this type is described in our U.S. Pat. No. 5,599,638, based on Ser. No. 08/135,007, the disclosure of which is herein incorporated by reference. That patent describes a breakthrough in aqueous methanol-based fuel cells.

This special aqueous-methanol fuel cell is the first practical fuel cell to operate without an acid electrolyte. Like many other fuel cells, however, this fuel cell requires a proton conducting membrane. The operation of the fuel cell is shown in FIG. 1 and briefly described with reference thereto. Since the present inventors include inventors of the fuel cell described with reference to FIG. 1, no admission or implication should be taken from this application that this application represents prior art.

At the time of the writing of this application, a preferred material for a proton conductivity was a perfluorinated proton-exchange material formed of a co-polymer of tetrafluoroethylene and perfluorovinylether sulfonic acid available from DuPont under the brand name Nafion™. Nafion 117 has been used extensively for a pro-ton-conducting membrane.

Nafion, however, raises its own host of problems. It is very expensive—Nafion costs $700 per square meter and at the time of writing of this patent application is more expensive per pound than platinum. Nor is Nafion ideal for its intended purpose. Nafion is quite sensitive to high heat, and can only be used effectively at temperatures below 90° to 100° C. These lower temperatures prevent fuel cells from being operated at their otherwise optimal temperatures of 270°–300° C.

Another problem with Nafion is its methanol permeability which allows a substantial amount of fuel crossover across the membrane as described above. Fuel can cross over: it passes across the anode, through the proton conducting membrane (Nafion), to the cathode. The fuel is then oxidized at the cathode instead of at the anode. Nafion's methanol permeability hence allows methanol to cross over and oxidize at the cathode. A mixed reaction (oxidation and reduction) develops on the cathode side, reducing the reaction efficiency. The inventors recognized that this methanol permeability lowers the efficiency of a methanol-based fuel cell.

Nafion's is intended to be used at temperature less than around 100° C. A fuel cell operating at a higher temperature, however, in the 200° to 300° C. range, would have a higher rate of oxygen reduction and a simultaneously-lowered activation energy of the chemical reaction. This higher temperature also increases the catalytic activity of the platinum catalyst. This is important, since the platinum catalyst proves to be one of the most expensive elements of the preferred fuel cell of the present invention.

Nafion also causes problems with water balance. Nafion has a very low rate of water uptake. As a consequence, extreme anode dehydration is caused. Too much anode dehydration causes a reduction in the membrane catalyst continuity. This effectively increases the resistance between the electrode and the membrane. This resistance raises the output voltage which needs to drop across the resistance. Heat is produced across the voltage drop. This also can result in membrane cracking or pin-holing, and a chemical short-circuit. In the worst case, the local gas recombination could lead to the possibility of explosion.

It is an object of the present invention to define new materials for use in such fuel cells. These new materials have low methanol permeability but high proton conductivity, and are made from inexpensive, readily available materials.

It is another object of the invention to provide such materials which are stable at higher temperatures. According to the present invention, proton conducting membranes are formed based on a sulfonic acid-containing polymer. One preferred material is polyether ether ketone or "PEEK". Another is poly (p phenylene ether sulfone) or "PES". Any sulfonic acid-containing polymer which has the requisite structural characteristics to act as a membrane could be used.

This material is further processed in a way to minimize the methanol permeability. One preferred aspect modifies the surface to produce asymmetric permeability properties by controlled cross-linking of sulfonate groups. The proton conductivity is attained by controlling the degree of sulfonation.

Another aspect modifies the materials using interpenetration polymer materials.

Yet another aspect uses zeolites to control the size of interpenetrating materials.

BRIEF DESCRIPTION OF THE DRAWINGS

These and other objects of the present invention will now be described in detail with reference to the accompanying drawing, in which.

DESCRIPTION OF THE PREFERRED EMBODIMENTS

Fuel cell

Figure 1:
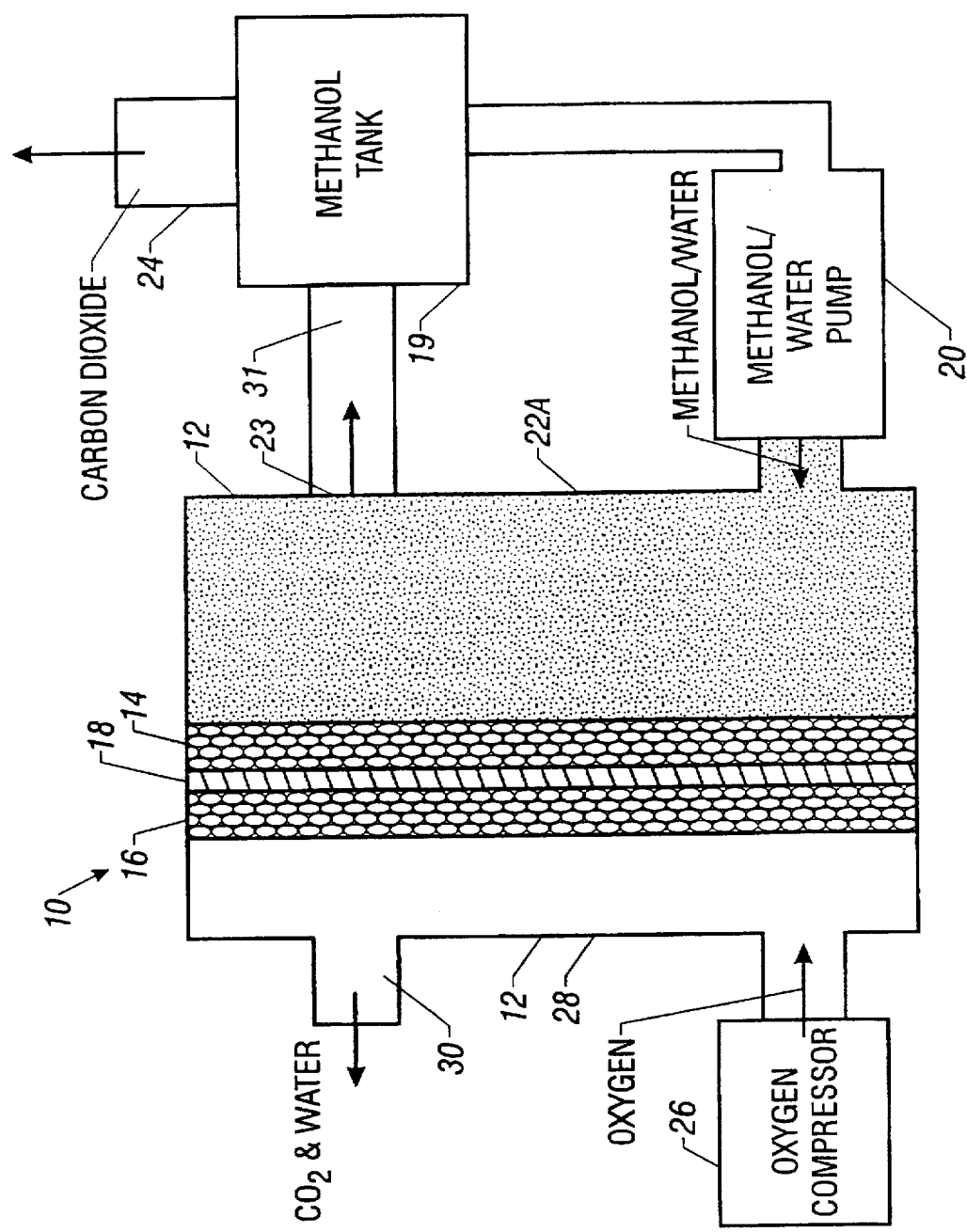
FIG. 1 shows a preferred fuel cell of the present invention.
Figure 2:
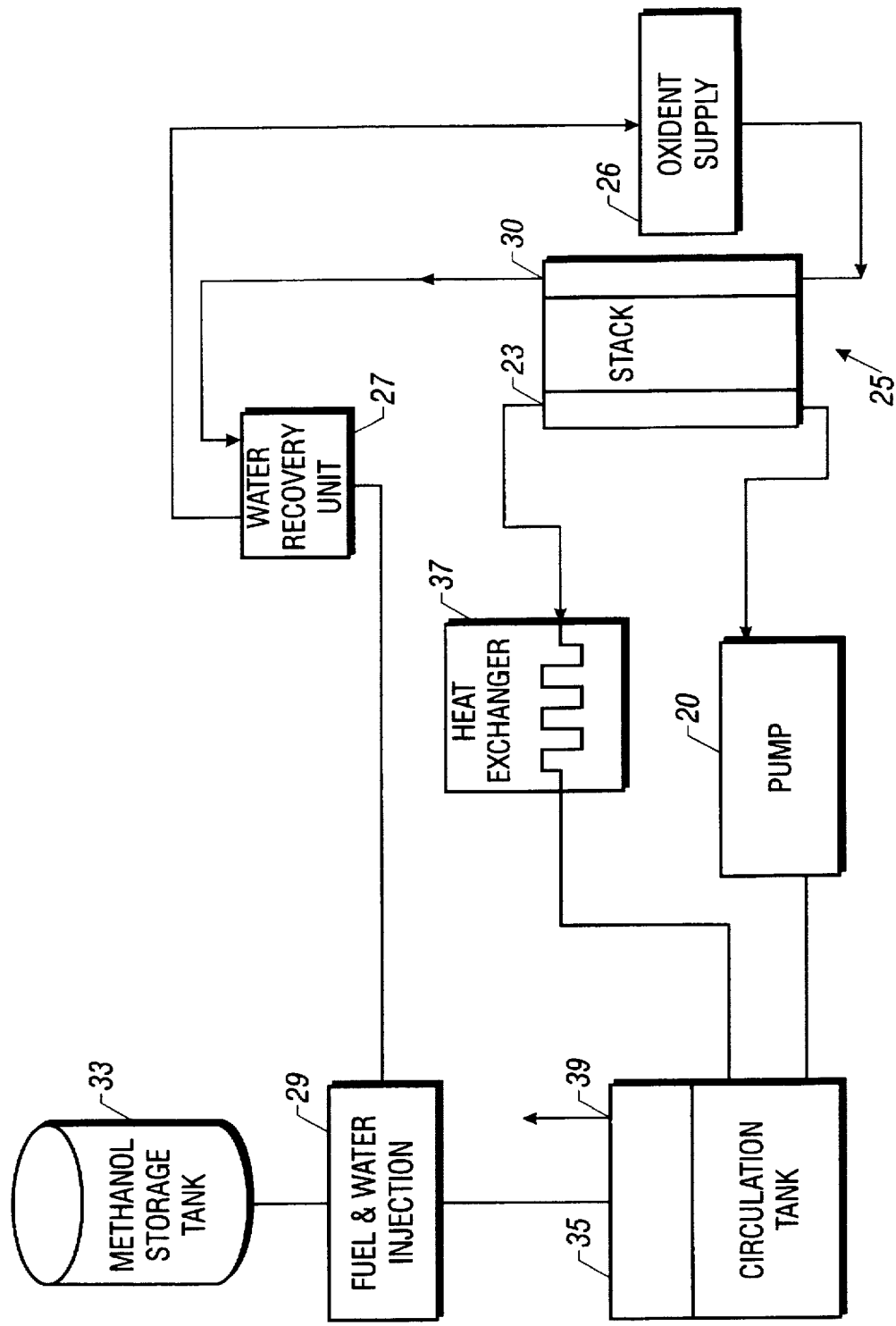
FIG. 2 shows an operational diagram of the fuel cell in use.

FIG. 1 illustrates a liquid feed organic fuel cell 10 having a housing 12, an anode 14, a cathode 16 and a solid polymer proton-conducting cation-exchange electrolyte membrane 18. As will be described in more detail below, anode 14, cathode 16 and solid polymer electrolyte membrane 18 are preferably a single multi-layer composite structure, referred to herein as a membrane-electrode assembly. A pump 20 is provided for pumping an organic fuel and water solution into an anode chamber 22 of housing 12. The organic fuel and water mixture is withdrawn through an outlet port 23 and is re-circulated through a re-circulation system described below with reference to FIG. 2 which includes a methanol tank 19. Carbon dioxide formed in the anode compartment is vented through a port 24 within tank 19. An oxygen or air compressor 26 is provided to feed oxygen or air into a cathode chamber 28 within housing 12. FIG. 2, described below, illustrates a fuel cell system incorporating a stack of individual fuel cells including the recirculation system. The following detailed description of the fuel cell of FIG. 1 primarily focuses on the structure and function of anode 14, cathode 16 and membrane 18.

Prior to use, anode chamber 22 is filled with the organic fuel and water mixture and cathode chamber 28 is filled with air or oxygen. During operation, the organic fuel is circulated past anode 14 while oxygen or air is pumped into chamber 28 and circulated past cathode 16. When an electrical load (not shown) is connected between anode 14 and cathode 16, electro-oxidation of the organic fuel occurs at anode 14 and electro-reduction of oxygen occurs at cathode 16. The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

As noted above, anode 14, cathode 16 and membrane 18 form a single composite layered structure. The material of the membrane 18 represents the important subject matter of the present invention.

Anode 14 is formed from platinum-ruthenium alloy particles either as fine metal powders, i.e. "unsupported", or dispersed on high surface area carbon, i.e. "supported". The high surface area carbon may be material such as Vulcan XC-72A, provided by Cabot Inc., USA. A carbon fiber sheet backing (not shown) is used to make electrical contact with the particles of the electrocatalyst. Commercially available Toray™ paper is used as the electrode backing sheet. A supported alloy electrocatalyst on a Toray™ paper backing is available from E-Tek, Inc., of Framingham, Mass. Alternately, both unsupported and supported electrocatalysts may be prepared by chemical methods, combined with Teflon™ binder and spread on Toray™ paper backing to produce the anode. An efficient and time-saving method of fabrication of electro-catalytic electrodes is described in detail herein below.

Platinum-based alloys in which a second metal is either tin, iridium, osmium, or rhenium can be used instead of platinum-ruthenium. In general, the choice of the alloy depends on the fuel to be used in the fuel cell. Platinum-ruthenium is preferable for electro-oxidation of methanol. For platinum-ruthenium, the loading of the alloy particles in the electrocatalyst layer is preferably in the range of 0.5–4.0 mg/cm². More efficient electro-oxidation is realized at higher loading levels, rather than lower loading levels.

Cathode 16 is a gas diffusion electrode in which platinum particles are bonded to one side of membrane 18. Cathode 16 is preferably formed from unsupported or supported platinum bonded to a side of membrane 18 opposite to anode 14. Unsupported platinum black (fuel cell grade) available from Johnson Matthey Inc., USA or supported platinum materials available from E-Tek Inc., USA are suitable for the cathode. As with the anode, the cathode metal particles are preferably mounted on a carbon backing material. The loading of the electrocatalyst particles onto the carbon backing is preferably in the range of 0.5–4.0 mg/cm². The electrocatalyst alloy and the carbon fiber backing contain 10–50 weight percent Teflon™ to provide hydrophobicity needed to create a three-phase boundary and to achieve efficient removal of water produced by electro-reduction of oxygen.

During operation, a fuel and water mixture (containing no acidic or alkaline electrolyte) in the concentration range of 0.5–3.0 mole/liter is circulated past anode 14 within anode chamber 22. Preferably, flow rates in the range of 10–500 milliliters/min. are used. As the fuel and water mixture circulates past anode 14, the following electrochemical reaction, for an exemplary methanol cell, occurs releasing electrons:

$$\text{Anode: } CH_3OH + H_2O \rightarrow CO_2 + 6H^+ + 6e^- \tag{1}$$

Carbon dioxide produced by the above reaction is withdrawn along with the fuel and water solution through outlet 23 and separated from the solution in a gas-liquid separator (described below with reference to FIG. 2). The fuel and water solution is then re-circulated into the cell by pump 20.

Simultaneous with the electrochemical reaction described in equation 1 above, another electrochemical reaction involving the electro-reduction of oxygen, which captures electrons, occurs at cathode 16 and is given by:

$$\text{Cathode: } O_2 + 4H^+ + 4e^- \rightarrow H_2O \tag{2}$$

The individual electrode reactions described by equations 1 and 2 result in an overall reaction for the exemplary methanol fuel cell given by:

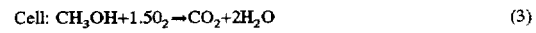

$$\text{Cell: } CH_3OH + 1.5O_2 \rightarrow CO_2 + 2H_2O \tag{3}$$

At sufficiently high concentrations of fuel, current densities greater than 500 mA/cm can be sustained. However, at these concentrations, a crossover rate of fuel across membrane 18 to cathode 16 increases to the extent that the efficiency and electrical performance of the fuel cell are reduced significantly. Concentrations below 0.5 mole/liter restrict cell operation to current densities less than 100 mA/cm². Lower flow rates have been found to be applicable at lower current densities. High flow rates are required while operating at high current densities to increase the rate of mass transport of organic fuel to the anode as well as to remove the carbon dioxide produced by electrochemical reaction. Low flow rates also reduce the crossover of the fuel from the anode to the cathode through the membrane.

Preferably, oxygen or air is circulated past cathode 16 at pressures in the range of 10 to 30 psig. Pressures greater than ambient improve the mass transport of oxygen to the sites of electrochemical reactions, especially at high current densities. Water produced by electrochemical reaction at the cathode is transported out of cathode chamber 28 by flow of oxygen through port 30.

In addition to undergoing electro-oxidation at the anode, the liquid fuel which is dissolved in water permeates through solid polymer electrolyte membrane 18 and combines with oxygen on the surface of the cathode electrocatalyst. This process is described by equation 3 for the example of methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimize the rate of fuel crossover.

The rate of crossover is proportional to the permeability of the fuel through the solid electrolyte membrane and increases with increasing concentration and temperature. By choosing a solid electrolyte membrane with low water content, the permeability of the membrane to the liquid fuel can be reduced. Reduced permeability for the fuel results in a lower crossover rate. Also, fuels having a large molecular size have a smaller diffusion coefficient than fuels which have small molecular size. Hence, permeability can be reduced by choosing a fuel having a large molecular size. While water soluble fuels are desirable, fuels with moderate solubility exhibit lowered permeability. Fuels with high boiling points do not vaporize and their transport through the membrane is in the liquid phase. Since the permeability for vapors is higher than liquids, fuels with high boiling points generally have a low crossover rate. The concentration of the liquid fuel can also be lowered to reduce the crossover rate. With an optimum distribution of hydrophobic and hydrophilic sites, the anode structure is adequately wetted by the liquid fuel to sustain electrochemical reaction and excessive amounts of fuel are prevented from having access to the membrane electrolyte. Thus, an appropriate choice of anode structures can result in the high performance and desired low crossover rates.

Because of the solid electrolyte membrane is permeable to water at temperatures greater than 60° C., considerable quantities of water are transported across the membrane by permeation and evaporation. The water transported through the membrane is condensed in a water recovery system and fed into a water tank (both described below with reference to FIG. 2) so that the water can be re-introduced into anode chamber 22.

Protons generated at anode 14 and water produced at cathode 16 are transported between the two electrodes by proton-conducting solid electrolyte membrane 18. The maintenance of high proton conductivity of membrane 18 is important to the effective operation of an organic/air fuel cell. The water content of the membrane is maintained by providing contact directly with the liquid fuel and water mixture. The thickness of the proton-conducting solid polymer electrolyte membranes should be in the range from 0.05–0.5 mm to be dimensionally stable. Membranes thinner than 0.05 mm may result in membrane electrode assemblies which are poor in mechanical strength, while membranes thicker than 0.5 mm may suffer extreme and damaging dimensional changes induced by swelling of the polymer by the liquid fuel and water solutions and also exhibit excessive resistance. The ionic conductivity of the membranes should be greater than 1 ohm$^{-1}$ cm$^{-1}$ for the fuel cell to have a tolerable internal resistance. As noted above, the membrane should have a low permeability to the liquid fuel.

Membrane Formation and Materials

The present inventors investigated alternative materials in an attempt to obviate these problems. We found some advantageous materials. These materials and their formation and processing are described in the embodiments disclosed herein.

These materials have two important characteristics: inexpensive starting materials, and enhanced protection against fuel crossover. Preferably, methanol transport across the membrane is limited. The methanol transport limiting can be carried out using one of the following embodiments.

First Embodiment

An inexpensive sulfonated material, e.g., sulfonic acid polymer, which is stable and electro-oxidative condition and susceptible of forming a membrane layer, is used as a starting material. That material should be inexpensive and also stable at high temperatures. The inventors recognized the material needs to include an excess number of proton conductors beyond that which is really needed for the proton conduction that is needed by the fuel cell. Preferably, those excess proton conductors are excess sulfonate groups. According to the present invention, that material is further processed to sacrifice some of the proton conductivity capability in a way as a trade off to reduce methanol permeability.

The first preferred material is poly ether ether ketone, "PEEK". PEEK is a temperature resistant and oxidatively stable engineering polymer. PEEK is converted into an asymmetric proton conducting membrane. The asymmetric membrane has spaces which allow protons to pass, but which minimize the amount of methanol molecules which pass. This hence reduces fuel crossover when this membrane is used in a fuel cell.

The methanol permeation is reduced according to this embodiment by surface modifications of the polymer.

The specific operation and results progress as follows. 120 grams of 250 p grade PEEK is stirred in 1200 ml of concentrated sulfuric acid ~97% ($H_2SO_4$) at room temperature for 4½ hours. The homogeneous solution resulting from this stirring is then heated to 91° C. for 1 hour. The reaction is then quenched and cooled to room temperature.

The polymer is then precipitated in ice slurry bath and filtered then washed to remove the excess acid, and to form an appropriate material. At pH 5 the polymer is dried under ambient conditions for 36 to 72 hours. The chemical reaction is given below.

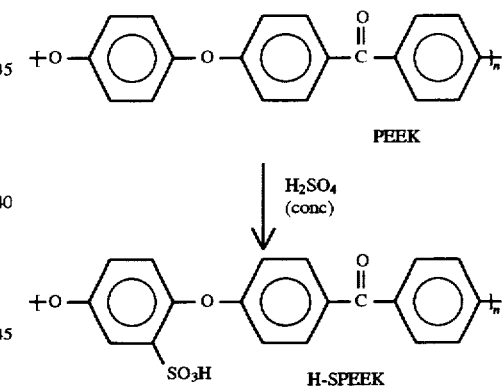

This first step forms high molecular weight material which we call H-SPEEK. H-SPEEK has an equivalent weight of 365. Unlike PEEK, H-SPEEK is soluble in an organic solvent and water mixture. One out of every three benzene rings in the material is sulfonated with a sulfonate ($SO_3H$) group.

The material is then dried, and then dissolved in a solvent mixture: preferably an acetone/water mixture. This mixture is further diluted with approximately 10% of the polymer sample weight of glycerin—here 3 g. The dissolved-polymer and glycerin mixture is then filtered over a chelate pack. This filtered mixture forms the cast film when the solvent is evaporated.

The preferred embodiment casts these films in glass pyrex dishes. Evaporation is carried out over a evaporation time which ranges between 24 and 48 hours.

A first technique of this first embodiment cross-links as follows. After the film has been set, the entire dish is heated to 120° C. under vacuum. The H-SPEEK formed by the above-discussed process has a large number of sulfonate groups on the benzene rings in the PEEK polymer chain. On the average, one out of every three rings include a sulfonate group. The H-SPEEK as formed in that way has about 365 mass per proton, a much better figure than Nafion™ which has a much larger value of 1144 mass per proton. This represents an excess proton capacity beyond what is really necessary for operating the fuel cell.

The inventors recognized that this left enough sulfonate groups so that some could be sacrificed for cross-linking. Even after further processing, the polymer maintains less than 600 mass per proton. The inventors recognized that even though there is a lot of cross-linking in the present invention, there is still a large amount of proton conductivity.

As described herein, even after further processing, the polymer maintains less than 600 mass per proton. The inventors recognized that even though there is a lot of cross-linking in the present invention, there is still a large amount of proton conductivity.

The heating at 120° C. under vacuum causes cross-linking shown below.

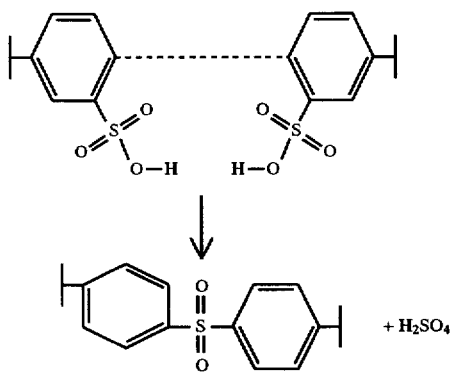

A nuclear magnetic resonance ("NMR") analysis of the sulfonic acid groups in the uncross-linked film was made. The NMR solution spectrum monitored $^1$H in deuterated dimethylsulfoxide ($_{d6}$DMSO) indicated one sulfonic acid group per repeat unit, where each repeat unit is as shown above in reaction 1, including three benzene rings.

A series of solutions that can contain the cross-linked membrane was back-titrated with a standard dilute solution of sodium hydroxide. The analysis of the titration indicated that after cross-linking, 28% of the sulfonic acid groups in the total solution had been converted to sulfone groups by the cross-linking process.

When sulfonating the PEEK, the inventor found that a trade-off was necessary between the amount of sulfonation and the necessity for a stable physical structure. More sulfonic acid improves the proton conducting performance. However, it also correspondingly degrades the physical structure of the resulting membrane. The inventors therefore developed a trade-off between the amount of sulfonation and the appropriate physical structure. They found that sulfonating one out of every three benzene rings provides the best trade-off between the two competing objectives.

The materials formed herein are preferably surface-dense. It was found that the surface-dense samples prepared by this process were comparable to commercial Nafion in mechanical strength and proton conductivity. These materials had a large number of sulfonic acid groups than Nafion. The cross-linking could therefore be carried out without significant loss of proton conductivity.

These surface-dense materials form an asymmetric membrane. Importantly for present purposes of the present invention, the material will allow water to pass, and has proton conductivity. However, the spaces between parts of the material are small enough to hinder the methanol ($CH_3OH$) from passing.

A second material embodiment of the present invention uses a different sulfonic acid polymer.

Poly (p-phenylene ether sulfone) or PES which is a liquid crystal polymer has the structure

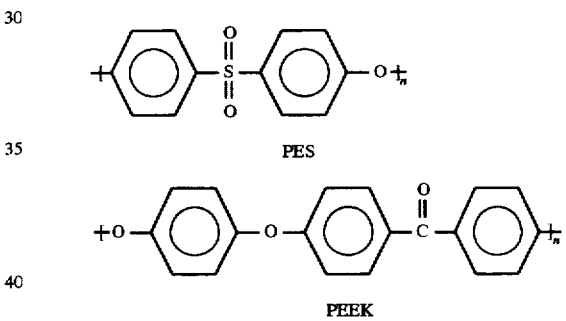

The operation on the PES is quite analogous to that of the PEEK described above. PES's glass transition temperature is 225° C., as compared with PEEK's glass transition temperature of 156° C. The price of PES is about $10 lb: an order of magnitude less than Nafion.

The sulfonation occurs as follows

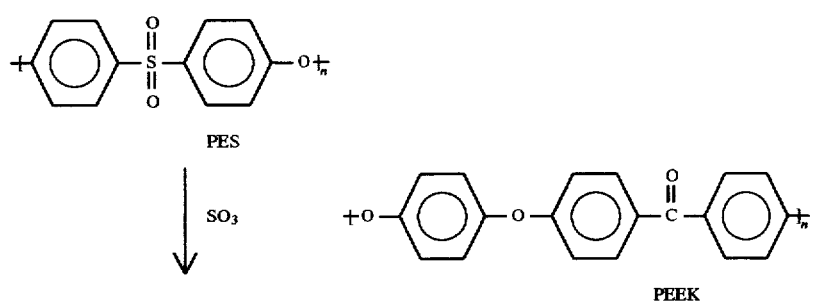

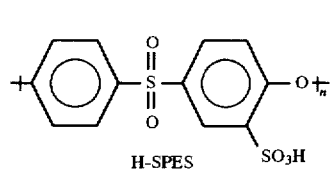

H-SPES

-continued

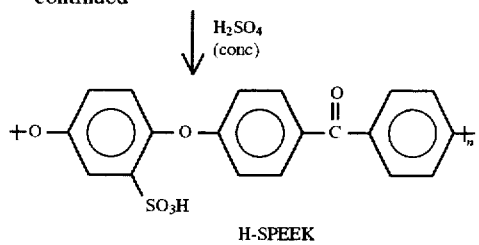

H-SPEEK

H-SPES-like H-SPEEK, requires a trade-off between the amount of sulfonation and its physical structure. Below 30% sulfonation, both materials act as ionomers. Above 70% sulfonation, these materials act as polyelectrolytes or PEs. By controlling the degree of sulfonation, the H-SPES film properties can be optimized: ease of film fabrication, strength and conductivity of the H-SPES film can be controlled and optimized.

An important property of both these materials as processed above is their large number of sulfonic acid groups allow sacrifice of sulfonic acid groups for appropriate cross-linking. It has already been described above that the H-SPEEK materials had 365 mass per proton. When cross-linked, these materials still have 504 mass per proton. This compares quite favorably with Nafion film's 1144 mass per proton. In addition, the sulfonic acid groups in H-SPEEK are located in the H-SPEEK backbone. This type of polyelectrolyte film is well-known to contain functional channel structures for proton conduction.

Two other alternative techniques are possible according to this first embodiment. A first technique varies the amount of water and organic solvents used as polymer solvents during the film casting process. As described above, the characteristics of these materials change based on the amount of sulfonation and nature of the solvent during the membrane fabrication. According to this aspect of the present invention, the amount of water is lowered or eliminated from H-SPEEK film casting solution during the time when the surface of the film is being cast. This casts a dense-surface area on the resulting film.

Another alternative technique forms two separate films: a first film which acts as the base backbone, and a second film forms low proton concentration coating on the base conducting membrane. This low proton concentration H-SPEEK or H-SPES is then cross-linked by heating under vacuum to form an anisotropic composite membrane. This forms a asymmetric membrane.

To summarize:

The first embodiment uses a process of surface modifying the material. The present embodiment preferably modifies only one "side" of the materials and not the other side. This asymmetric modification provides a surface-dense anisotropic membrane. That surface-dense membrane faces the anode to minimize methanol cross-over.

The modification of surface morphology can be carried out by varying the proportion of water and organic solvent used as polymer solvent. This allows modifying the rate of solvent evaporation during the film casting process.

An alternate technique is to heat the surface to cause polymer cross-linking.

Figure 3:
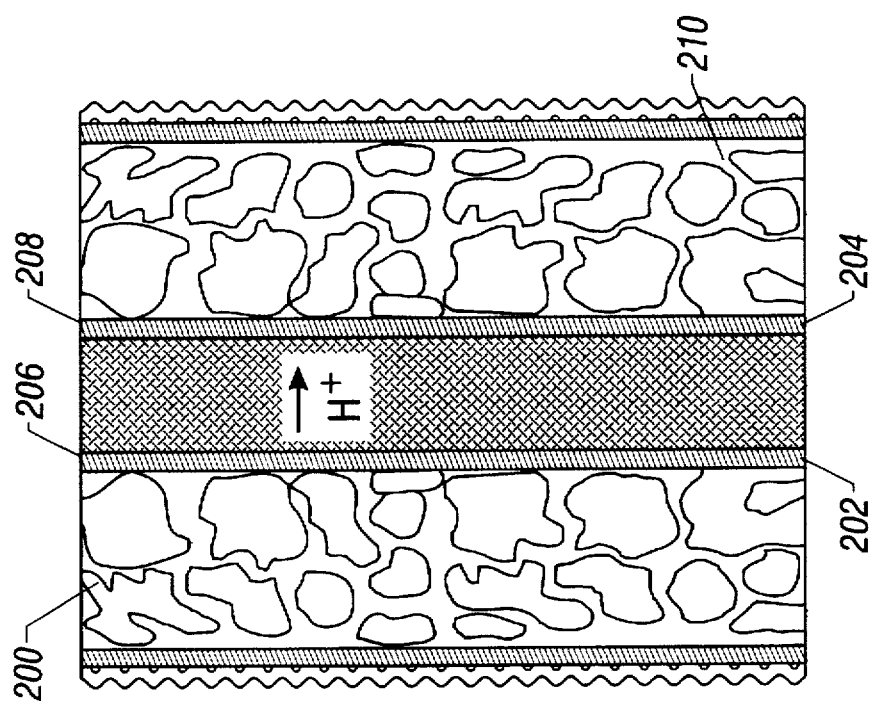
FIG. 3 shows a basic operation of a fuel cell using the preferred membrane material of the present invention.

An alternate technique of modification of surface morphology applies a thin, low proton concentration H-SPEEK or H-SPES coating on the base conducting membrane as shown in FIG. 3. Cross-linking of this thin coating can have similar effects to those discussed above.

Second embodiment

The methanol transport is limited according to this second embodiment by optimizing hydrophobic and hydrophilic polymer chain interactions. Proton-conducting inter penetration polymer networks are formed by using a combination of these structures.

The second embodiment forms a similar starting compound to that described above.

The second type of structural modification according to the present invention which forms an asymmetric membrane by modifying the highly sulfonated PEEK or PES to form an inter-penetrating polymer network. This proton conducting membrane system forms from two types of proton conducting polymer network. The type I membrane forms from a cross-linked hydrophobic polymer chain and inter-penetrating with another cross linked hydrophilic polymer chain as described above. This type I membrane has a variable amount of low sulfonated H-SPES. It also has cross-linked hydrophobic polymer chains of highly sulfonated H-SPEEK.

The type II membrane has cross-linked hydrophobic varying low sulfonated H-SPEEK as well as cross-linked hydrophilic highly sulfonated H-SPES. Both materials have their chemical structure modified according to the following:

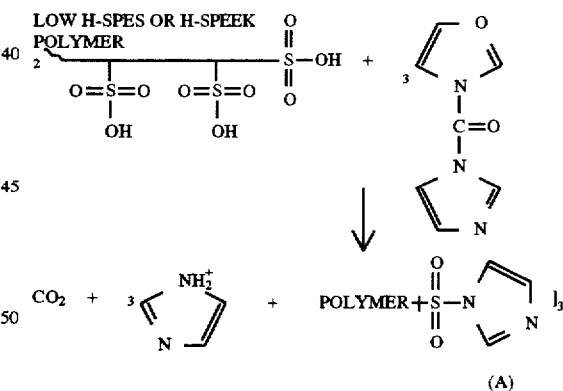

(A)

The highly sulfonated H-SPEEK or H-SPES can be cross-linked at high temperature according to the reaction mechanism previously shown.

Type I film is formed from a film casting solution mixture including compound A, compound B, and highly sulfonated H-SPEEK or H-SPES. Type II material with inter-penetration polymer networks is formed of hydrophobic H-SPEEK and hydrophilic H-SPES. This can also be prepared using the same method. This effectively causes two different kinds of polymers, with different chemical properties. Both have proton conductivity, but both have different structures. These different structures have been found to minimize the fuel crossover.

Third embodiment

The third embodiment modifies free volumes in proton conducting membranes. These free volumes can be reduced by preparing small particle-size-selected zeolites-preferably mordenite. This reduction of free volume by incorporating zeolite particles into the membranes serves to reduce methanol crossover. The zeolites are selected such that the diameters of the interstitial channels are sufficiently narrow to block out methanol molecules. The zeolites do have proton conductivity and hence do not reduce the proton conductivity characteristic of the membranes.

A zeolite material is added to the H-SPEEK or H-SPES to form a zeolite/H-SPEEK or zeolite/H-SPES composite membrane. The proton-containing H-SPEEK and H-SPES, as well as the proton in the hole of zeolite will cause proton conductivity.

The preferred zeolite used according to this embodiment is proton containing mordenite. The mordenite is added to the H-SPEEK or H-SPES proton conducting composite membrane. The inventor found that this reduces the free volume of the membrane, and therefore also reduces the methanol crossover.

Mordenite has the function of a molecular sieve, selectively adsorbing or rejecting different molecules. The ionic conductivity of mordenite is depending on the nature of the cation and the water concentration.

For example, mordenite which has a lot of tin therein. So called "tin-rich mordenite" is highly conducting. Calcium and Barium rich mordenites do not occlude methanol, because the diameters of the narrowest cross-section of the interstitial channel is between 3.48 and 4.0 angstroms. Mordenite is very stable in acid solutions of around pH 0.75.

Mordenite is well described in the literature. Several types of described zeolite material can be used. The inventors believe that the best mordenite will include $H^+$.

The preferred fuel cell final assembly is shown in FIG. 3. This includes an anode which is a porous carbon electrode including carbon/catalyst particles coated with the materials of the present invention. The anode current collector 202 includes carbon paper fiber impregnated with the material. Proton conducting membrane 204 of the present invention adjoins the cathode 206. The proton conducting membrane preferably includes a dense surface of proton conducting membrane 206 facing the anode 200. The surface 208 facing cathode 210 is preferably a very thin layer of cross-linked low proton conducting surface.

The cathode 210 includes carbon catalyst particles also coated with high H-SPEEK or H-SPES.

Although only a few embodiments have been described in detail above, those having ordinary skill in the art certainly understand that many modifications are possible in this preferred embodiment without departing from the advantageous structure of the present invention. For example, while H-SPEEK and H-SPES have been described above as being the preferred materials, it should be understood that other alternative materials can also be used. Any similar material which is capable of sulfonation and cross-linking can be used in place of the H-SPEEK or H-SPES. The specific kind of inter-penetrating polymer which is used is only exemplary, and it should be understood that other inter-penetrating polymers could be used. Moreover, the zeolite could be any zeolite which forms the necessary function, and the criteria for choosing an appropriate zeolite have been described above.

What is claimed:

1. A method of processing a polymer to enhance its proton conducting characteristics, comprising:

obtaining a polymer material which can be treated to form a material with proton conducting characteristics, treating said polymer material to enhance its proton conducting characteristics by adding sulfonate groups in a way to increase proton conductivity; and crosslinking the sulfonate groups on one surface of said polymer material only, and not on the other surface of said polymer material to form a material which has asymmetric surface-dense characteristics.

2. A method as in claim 1, wherein said material is poly ether ether ketone.

3. A method as in claim 1, wherein said material is p-phenylene ether sulfone.

4. A method as in claim 1, wherein said crossing-linking follows the chemical reaction that

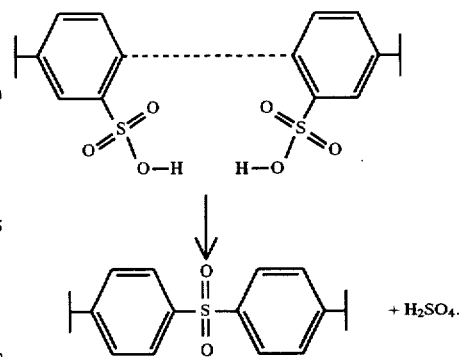

5. A method of forming a proton conducting polymer film for use in a methanol based fuel cell, comprising:

obtaining a polymer material which can be treated to form a material with proton conducting characteristics;

treating said polymer material to enhance its proton conducting characteristics by adding sulfonate groups in a way to increase proton conductivity; and adding an additional element to the polymer material after said treating, said additional element being one which further enhances methanol occlusion.

6. A method as in claim 5, wherein said additional element is a material including inter-penetration polymer network.

7. A method as in claim 5, wherein said additional element includes zeolites.

8. A method as in claim 7, wherein said zeolites include mordenite having a characteristic to occlude methanol but not occlude water or protons.

9. A method of forming an asymmetric proton-conducting polymer film, comprising:

obtaining a polymer material;

selectively sulfonating said polymer material, to an amount which would conduct more protons than those needed for an application;

crosslinking the sulfonate groups on one surface of said polymer material only, and not on the other surface of said polymer material to form a material which has asymmetric surface-dense characteristics.

10. A method as in claim 9, wherein said crosslinking is carried out by heating a surface of said polymer material.

11. A method of forming an asymmetric proton-conducting polymer film, comprising:

obtaining a polymer material;

wherein said obtaining comprises dissolving H-SPEEK into a solvent, removing solvent, casting a film from the H-SPEEK solution after removing the solvent; and heating the resulting dry film in vacuum above 100° C. to produce a cross-linked proton conducting membrane;

selectively sulfonating said polymer material, to an amount which would conduct more protons than those needed for an application;

cross-linking some of said sulfonate groups in a way such that the cross-linked sulfonate groups will not conduct protons; and using un-cross-linked sulfonate groups to conduct protons.

12. A method of forming an asymmetric proton-conducting polymer film, comprising:

obtaining a polymer material;

wherein said material is obtained by dissolving H-SPES into a solvent, removing solvent, casting a film from the H-SPES solution after removing the solvent; and heating the resulting dry film in vacuum above 100° C. to produce a cross-linked proton conducting membrane;

selectively sulfonating said polymer material, to an amount which would conduct more protons than those needed for an application;

cross-linking some of said sulfonate groups in a way such that the cross-linked sulfonate groups will not conduct protons; and using un-cross-linked sulfonate groups to conduct protons.

13. A method of processing an asymmetrical conducting polymer film, comprising:

obtaining a first polymer;

processing said polymer to add sulfonic acid groups thereto in an effective amount to allow proton conduction; and modifying a morphology of the resultant compound to limit the transport of methanol across the membrane more than a limiting proton or water conduction across the membrane by crosslinking the sulfonate groups on one surface of the polymer film only, and not on the other surface of the polymer film to form a material which has asymmetric surface-dense characteristics.

14. A method as in claim 13, wherein said morphology modification comprises varying a proportion of water to a solvent when forming the polymer film.

15. A method of processing an asymmetrical conducting polymer film, comprising:

obtaining a first polymer;

processing said polymer to add sulfonic acid groups thereto in an effective amount to allow proton conduction; and modifying a morphology of the resultant compound to limit the transport of methanol across the membrane more than a limiting proton or water conduction across the membrane, wherein said morphology changing comprising adding a proton conducting interpenetration polymer network.

16. A method of processing an asymmetrical conducting polymer film, comprising:

obtaining a first polymer;

processing said polymer to add sulfonic acid groups thereto in an effective amount to allow proton conduction; and modifying a morphology of the resultant compound to limit the transport of methanol across the membrane more than a limiting proton or water conduction across the membrane, wherein said morphology modification comprises adding particle size selected materials.

17. A method as in claim 16, wherein said particle size selected materials are zeolites.

18. A method as in claim 16, wherein said zeolites include mordenite or mordant.

19. A method of forming a proton conducting polymer film, comprising:

obtaining a polymer material selected from the group consisting of poly ether ether ketone or p-phenylene ether sulfone;

treating said polymer to form a treated polymer with proton conducting characteristics;

forming the treated polymer into a membrane; and further treating the treated polymer in a way to change its characteristic in a way to allow proton conduction but to minimize conduction of larger materials.

* * * * *